US00RE39168E

(19) United States
(12) Reissued Patent
Hirota et al.

(10) Patent Number: US RE39,168 E
(45) Date of Reissued Patent: Jul. 11, 2006

(54) IMAGE FORMING APPARATUS IN USE WITH A SHEET POST-PROCESSING APPARATUS

(75) Inventors: Kazuhiro Hirota, Hachioji (JP); Hisao Hosoya, Hachioji (JP); Masanobu Kawano, Hachioji (JP); Shogo Kato, Hachioji (JP); Naoki Otomo, Hachioji (JP); Yuji Kanazawa, Musashino (JP); Takanori Yoshida, Toda (JP); Yukihiko Nishimoto, Akiruno (JP); Mamoru Tomotsune, Asaka (JP)

(73) Assignee: Konica Corporation, Tokyo (JP)

(21) Appl. No.: 10/436,000

(22) Filed: May 12, 2003

Related U.S. Patent Documents

Reissue of:
(64) Patent No.: 6,233,427
Issued: May 15, 2001
Appl. No.: 09/394,846
Filed: Sep. 13, 1999

(30) Foreign Application Priority Data

Sep. 17, 1998 (JP) ..... 10-263062

(51) Int. Cl.
*G03G 15/00* (2006.01)

(52) U.S. Cl. ..... 399/407; 399/405
(58) Field of Classification Search ..... 271/3.03, 271/207, 279, 287, 301; 399/107, 401, 403, 399/405, 407, 408, 409, 410
See application file for complete search history.

(56) References Cited

U.S. PATENT DOCUMENTS

| | | | | |
|---|---|---|---|---|
| 5,926,684 | A | * 7/1999 | Horiuchi et al. | 399/402 |
| 5,995,773 | A | * 11/1999 | Awano | 399/21 |
| 6,308,948 | B1 | * 10/2001 | Azumi | 271/207 |

FOREIGN PATENT DOCUMENTS

| | | |
|---|---|---|
| JP | 60-142359 | * 7/1985 |
| JP | 60-158463 | * 8/1985 |
| JP | 62-239169 | * 10/1987 |
| JP | 62-288002 | * 12/1987 |
| JP | 63-267667 | * 11/1988 |
| JP | 2276691 | * 11/1990 |
| JP | 541991 | * 6/1993 |
| JP | 5-313428 | 11/1993 |
| JP | 8319054 | * 12/1996 |
| JP | 9309655 | * 12/1997 |
| JP | 1179540 | 3/1999 |

* cited by examiner

*Primary Examiner*—Hoang Ngo
(74) *Attorney, Agent, or Firm*—Lucas & Mercanti LLP

(57) ABSTRACT

An image forming apparatus, having a sheet ejection section, provided in an upper portion of the image forming apparatus, for ejecting a recording sheet onto an upper surface portion of the image forming apparatus; a sheet post-processing apparatus for receiving the recording sheet, ejected from the sheet ejection section, so as to perform a post-processing operation upon the recording sheet; and a coupler for coupling the sheet post-processing apparatus with the image forming apparatus so that at least a part of the post-processing apparatus is located on the upper surface portion of the image forming apparatus.

53 Claims, 7 Drawing Sheets

IMAGE FORMING APPARATUS IN USE WITH A SHEET POST-PROCESSING APPARATUS

Matter enclosed in heavy brackets [ ] appears in the original patent but forms no part of this reissue specification; matter printed in italics indicates the additions made by reissue.

BACKGROUND OF THE INVENTION

The present invention relates to an image forming apparatus capable of being mounted with a sheet post-processing apparatus which conducts post-processing such as staple processing, or shift sorting processing, on a sheet ejected out of an image forming apparatus such as an electrophotographic copying machine, a printer and a facsimile machine.

There is used a sheet post-processing apparatus called a finisher as an apparatus which conducts collating and stapling with a stapler for the number of sets of copies for plural recording sheets which have thereon recorded images and are ejected out of an image forming apparatus. Further, some of the sheet post-processing apparatuses have functions of shift sorting processing, collating processing, punching processing and bookbinding processing, in addition to the aforesaid staple processing.

This finisher is connected to an image forming apparatus such as a copying machine and a printer in terms of function, and it is driven in accordance with sequence operations of copy process or print process.

There is an image forming apparatus wherein a sheet ejection section is provided on the upper portion of the image forming apparatus, and a sheet having thereon formed images is ejected out of the sheet ejection section onto the top face of the apparatus to be stacked thereon, in the case of ordinary sheet ejection.

In TOKKAIHEI No. 9-309655, there is disclosed image forming apparatus 1 wherein image forming section 62 is arranged under sheet ejection section 61 and sheet-feeding section 63 is arranged under the image forming section 62, and a sheet is conveyed vertically.

Sheet S fed from sheet-feeding tray 631 of the sheet-feeding section 63 is fed to paired registration rollers 65 on sheet conveyance path 64. On the other hand, in synchronization with a toner image formed by writing unit 66 on photoreceptor drum 621 of the image forming section 62, the sheet S is conveyed from the paired registration rollers 65 to transfer section 622 where the toner image is transferred onto the sheet S. The sheet S carrying thereon the toner image is conveyed to fixing section 67 where the toner image is fixed, and then is conveyed to the sheet ejection section 61. Then, the sheet S is conveyed through horizontal conveyance path 681 of relay conveyance unit 68 provided on the upper portion of the image forming apparatus 1, to be fed into sheet post-processing apparatus FS.

The sheet post-processing apparatus FS conducts sheet post-processing such as staple processing, shift sorting and collating for the sheet S accepted by the sheet post-processing apparatus FS, and then, ejects the sheet S on a sheet ejection tray.

FIG. 7(b) shows an another example of a conventional image forming apparatus wherein sheet conveyance in an image forming section is made to be in the vertical direction. On the upper portion of image forming apparatus 1, there is mounted sorter (mail box) ST having a sheet ejection tray with four bins.

Incidentally, sheet post-processing apparatuses are already disclosed in TOKKAISHO Nos. 60-142359, 60-158463, 62-239169, 62-288002, 63-267667, TOKKAIHEI Nos. 2-276691, 8-319054 and TOKKOHEI No. 5-41991.

In image forming apparatus 1 shown in FIG. 7(a), sheet post-processing apparatus FS is connected to the side of image forming apparatus 1. Therefore, horizontal conveyance path 681 of relay conveyance unit 68 is made to be long and large and conveyance processing after sheet ejection is made to take a long time accordingly, which is a disadvantage, and sheet conveyance efficiency is lowered. Further, a housing which houses therein a staple processing section, a shift sorting processing section and a sheet intermediate stacking section (intermediate stacker section) is protruded bulkily from the side of image forming apparatus 1, which causes a disadvantage of increase in a floor space.

In image forming apparatus 1 shown in FIG. 7(b), the total height as a system is increased, because sorter (mail box) ST as a sheet post-processing apparatus is connected to the top surface of image forming apparatus 1. In particular, if an image reading device (scanner) is provided on the upper portion of image forming apparatus 1, the scanning plane of the scanner is heightened to make an operation difficult. In addition to that, the number of bins in the sorter and the number of sheets to be stacked are restricted.

An object of the invention is to correct the aforesaid disadvantage in an image forming apparatus equipped with a conventional sheet post-processing apparatus and to attain the following objects.

(1) To improve copying productivity by shortening a sheet conveyance path in the image forming apparatus and in the sheet post-processing apparatus and thereby by reducing sheet conveyance time, and to improve sheet conveyance efficiency and lower the cost by simplifying the sheet conveyance mechanism.

(2) To offer a compact system by reducing the floor space of the image forming apparatus equipped with a sheet post-processing apparatus.

(3) To offer a sheet post-processing apparatus capable of being provided with multi-deck sheet ejection tray (for example, sheet ejection tray with 10–20 bins) or with a movable sheet ejection tray having a long distance to go up and down on which a large number of sheets (for example, 2000 sheets) can be stacked.

SUMMARY OF THE INVENTION

The object stated above can be attained by an image forming apparatus having on the upper portion thereof a sheet ejection section which ejects a sheet having thereon formed images onto the top face of the image forming apparatus, wherein a sheet post-processing apparatus having a sheet conveyance section capable of being connected to the sheet ejection section is installed removably on the top face of the image forming apparatus.

Figure 4:
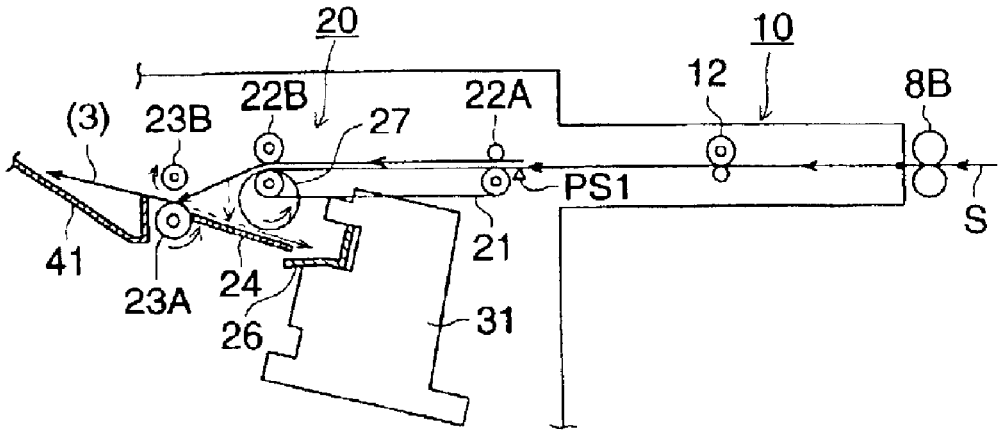
Figure 4:
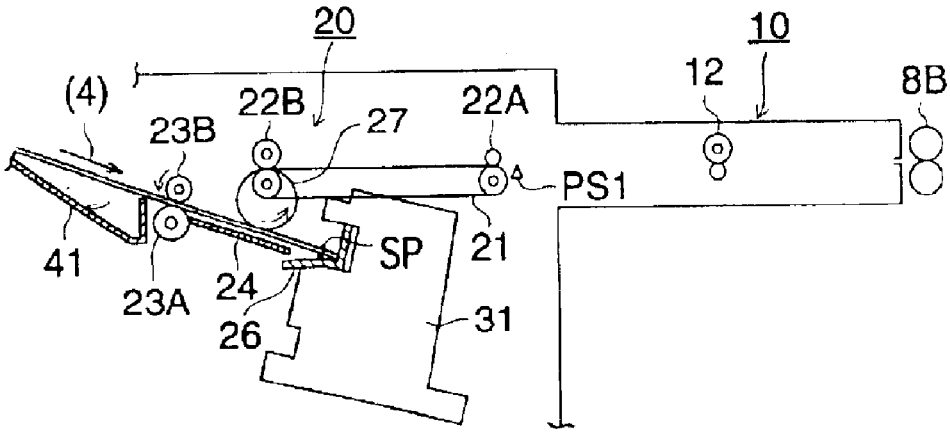
Figure 4:
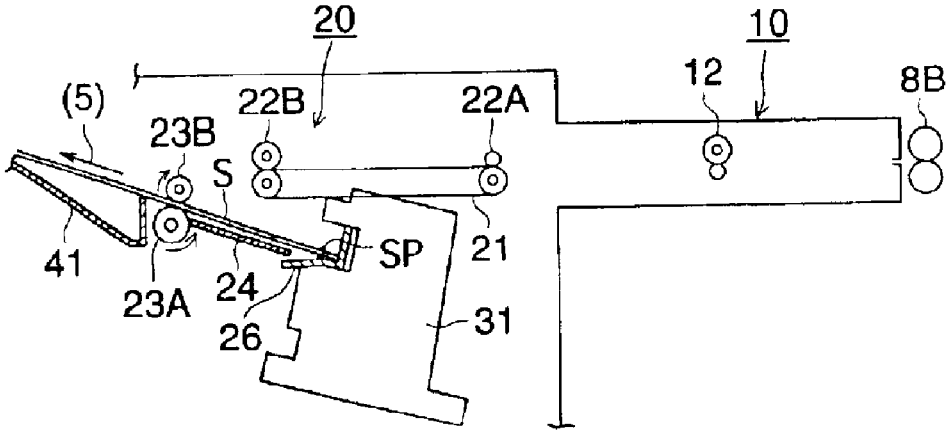

Each of FIGS. 4(a)–4(c) is an illustrative diagram showing how a sheet is conveyed by the sheet post-processing apparatus.

Figure 5:
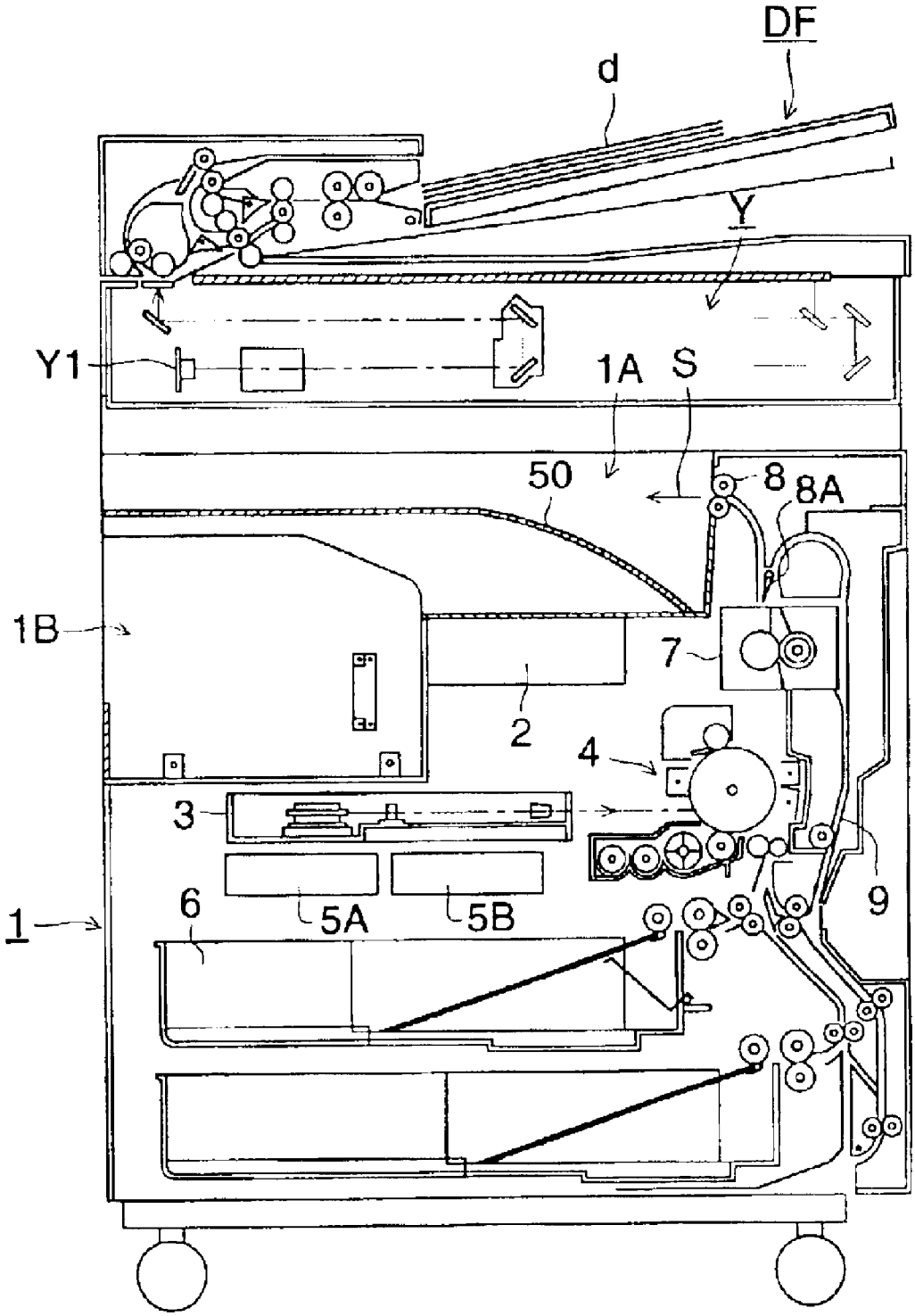

FIG. 5 is a sectional view of an image forming apparatus showing how a sheet ejection tray is mounted.

Figure 6:
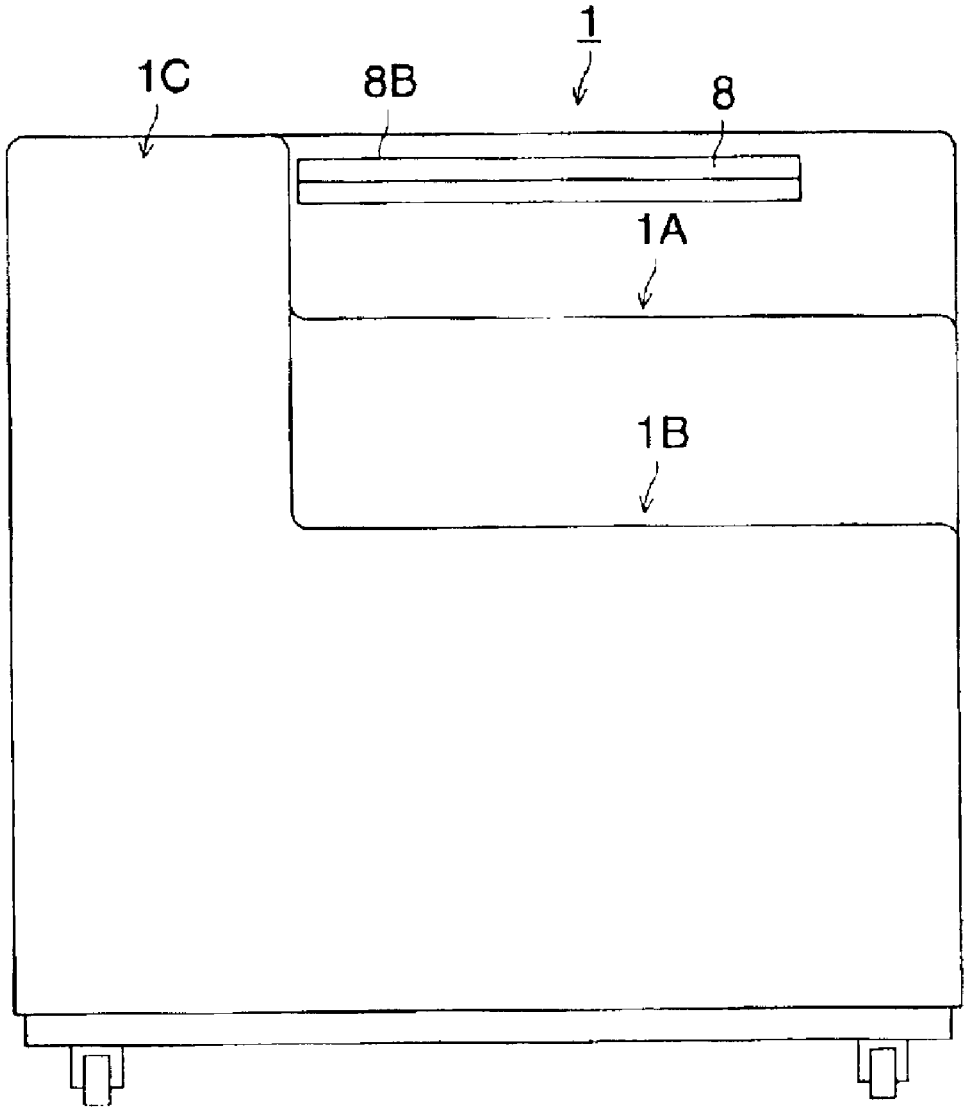

FIG. 6 is a side view of the left side of an image forming apparatus from which a sheet post-processing apparatus and a sheet ejection tray have been removed.

Figure 7:
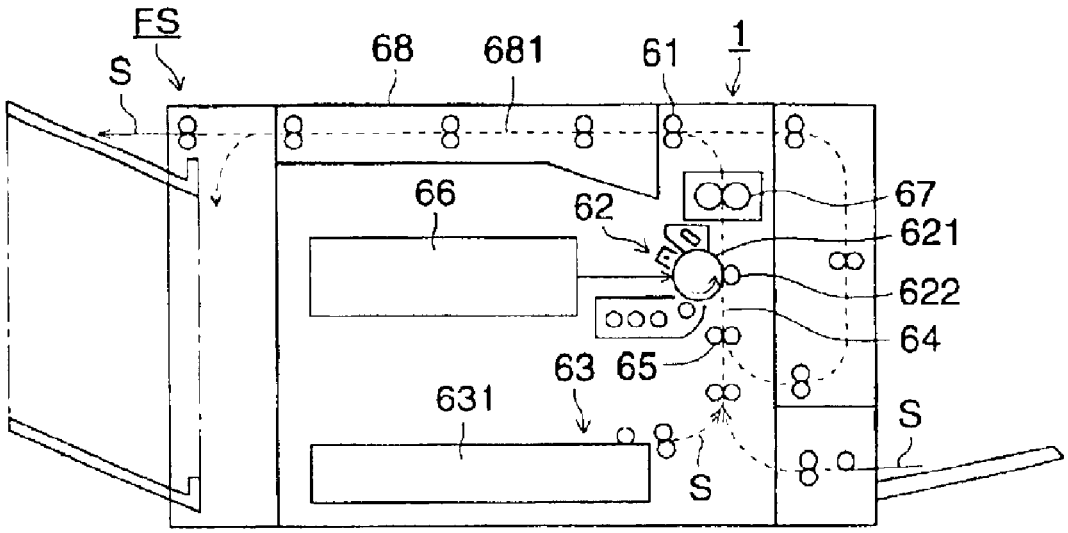
FIG. 7 (a) PRIOR ART
Figure 7:
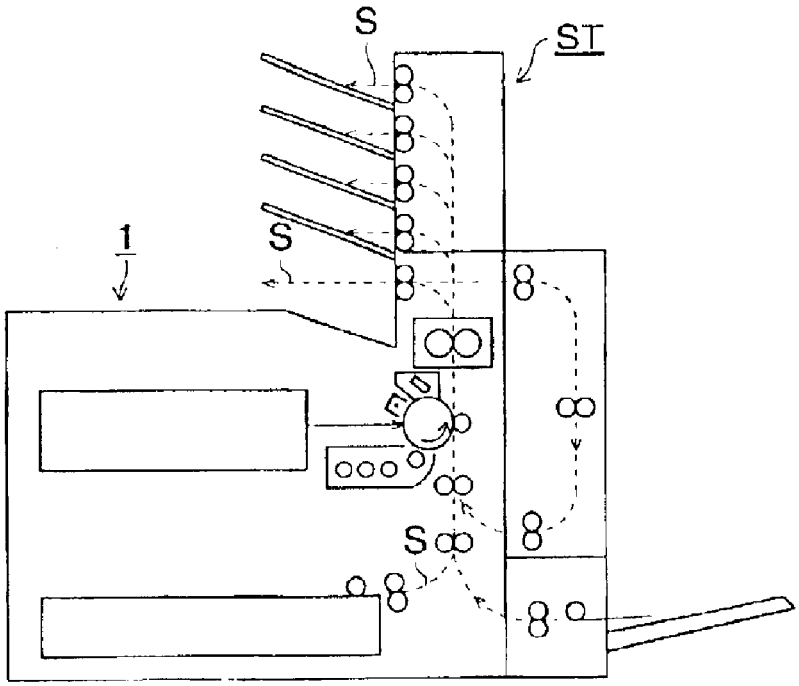
FIG. 7 (b) PRIOR ART

FIGS. 7(a) and 7(b) represent a structure diagram of an image forming apparatus equipped with a conventional sheet post-processing apparatus.

DETAILED DESCRIPTION OF THE INVENTION

Next, an embodiment of the image forming apparatus equipped with a sheet post-processing apparatus will be explained based on the diagrams attached hereto.

Figure 1:
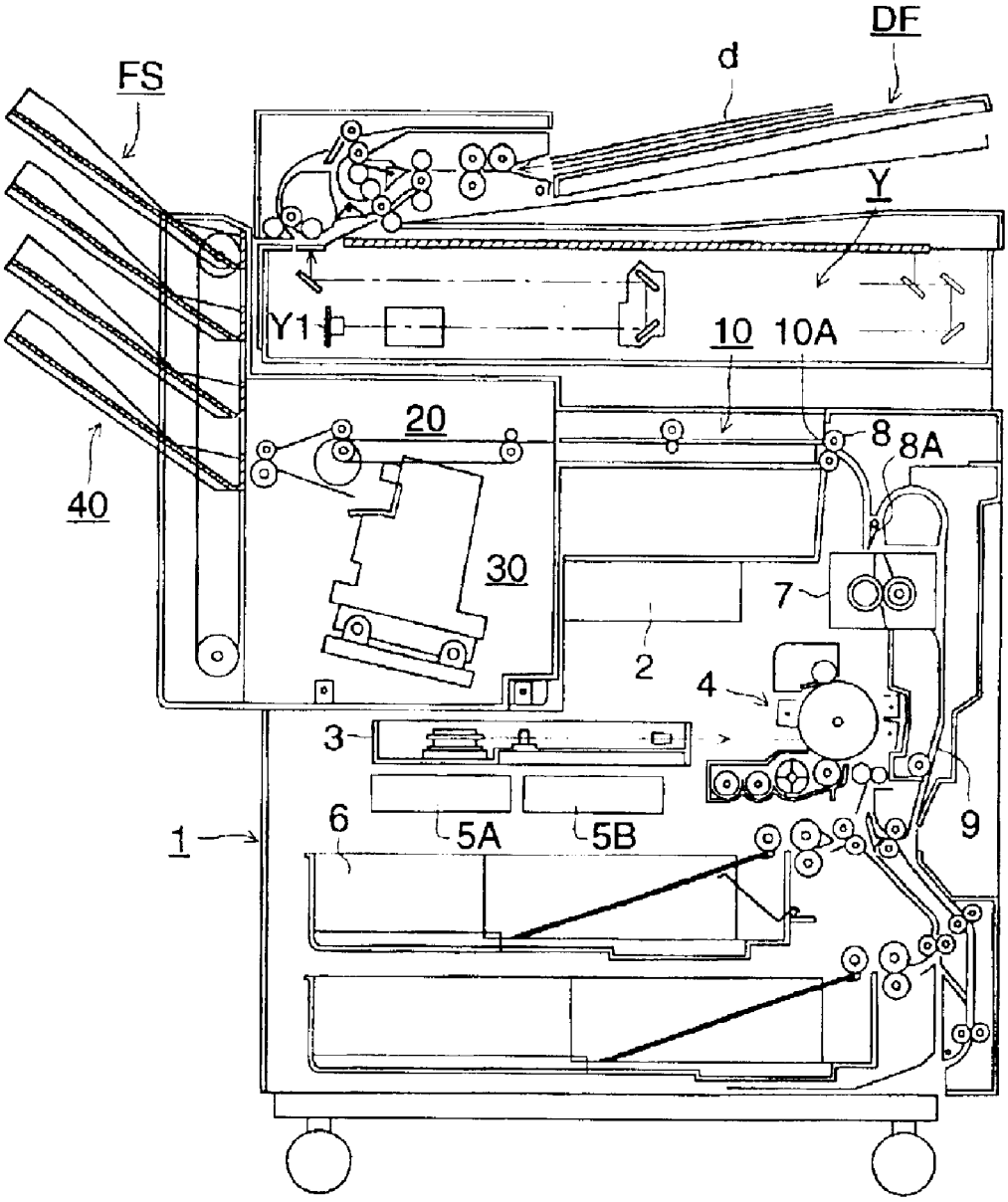
FIG. 1 is a diagram of the total structure of an image forming apparatus equipped with a sheet post-processing apparatus and an automatic document feeder.

FIG. 1 is a diagram of the total structure of image forming apparatus 1 equipped with sheet post-processing apparatus (finisher) FS, automatic document feeder DF and image reading device (scanner) Y.

The illustrated image forming apparatus 1 is equipped with image processing section 2, image writing section 3, image forming section 4, high voltage power supply sections 5A and 5B, cassette sheet-feeding section 6, fixing unit 7, sheet ejection section 8 and automatic duplex copy sheet-feeding section (ADU) 9.

On the upper portion of the image forming apparatus 1, there are mounted image reading device Y and automatic document feeder DE. On the part of sheet ejection section 8 on the illustrated left side of the image forming apparatus 1, there is connected sheet post-processing apparatus (finisher) FS.

Document d placed on a platen of automatic document feeder DF is conveyed in the arrayed direction, and images on one side or on both sides are read by an optical system of image reading device Y, and then are read onto CCD image sensor Y1.

Analog signal obtained through photoelectric transfer by CCD image sensor Y1 are subjected to analog processing, A/D transfer, shading correction, and image compression processing at the image processing section, and then, signals are sent to image writing section 3.

In the image writing section 3, light outputted from a semiconductor laser is irradiated on a photoreceptor drum of image forming section 4, and a latent image is formed. In the image forming section 4, processing operations such as charging, exposure, developing, transfer, separation and cleaning are conducted, and images are transferred onto sheet S conveyed from cassette sheet-feeding section 6. The sheet S carrying images is subjected to fixing by fixing unit 7, and is fed into sheet post-processing apparatus FS from sheet ejection section 8. Or, sheet S on which image processing has been finished on one side thereof fed into automatic duplex copy sheet-feeding section 9 by conveyance path switching plate 8A is subjected again to duplex image forming at image forming section 4, and then is fed into sheet post-processing apparatus FS from sheet ejection section 8.

The sheet post-processing apparatus FS is removably installed on the upper portion of the main body of image forming apparatus 1. In the sheet post-processing apparatus FS, sheet conveyance section 10, sheet stacking section 20, sheet post-processing section 30 and movable sheet ejection tray section 40 are arranged to be almost in the horizontal direction.

Figure 2:
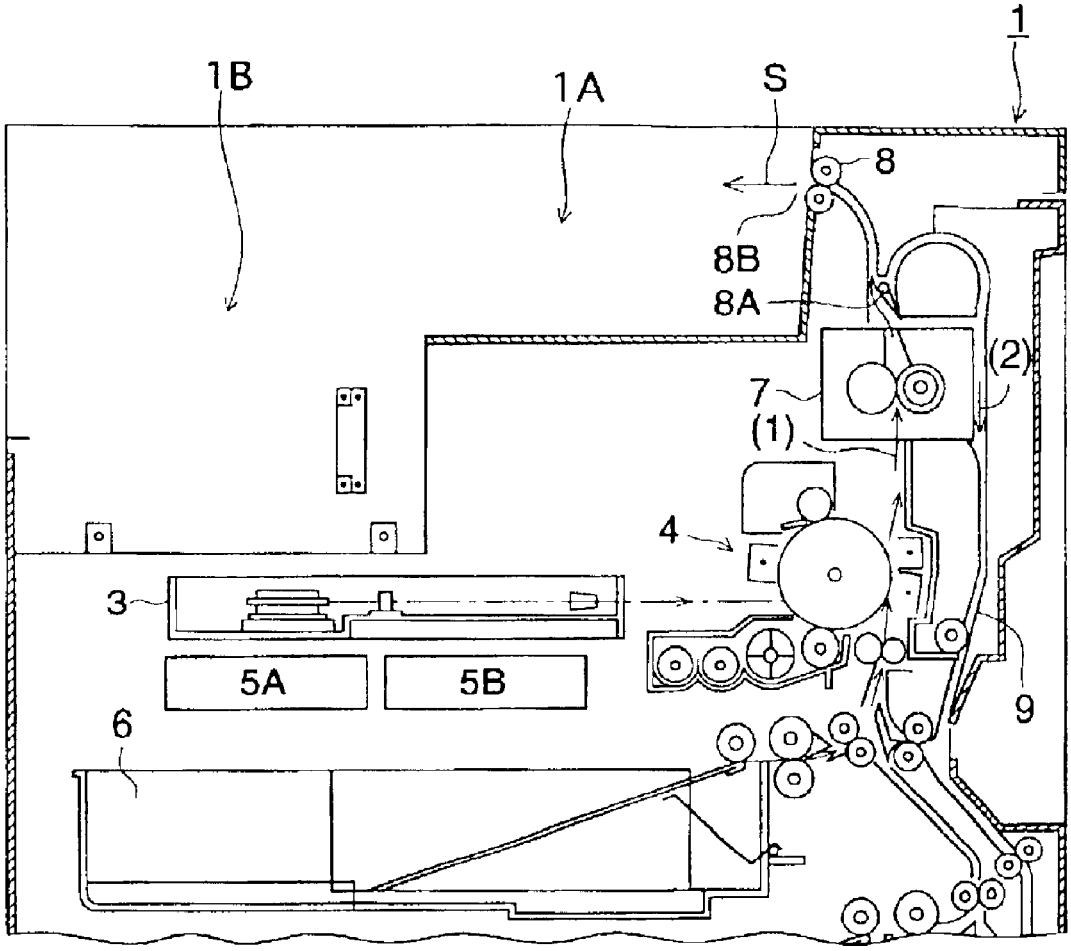
FIG. 2 is a sectional view showing the structure of the upper portion of the image forming apparatus from which the sheet post-processing apparatus has been removed.

FIG. 2 is a sectional view showing the structure of the upper portion of image forming apparatus 1 from which sheet post-processing apparatus FS is removed.

In FIG. 1 and FIG. 2, on the right side in the image forming apparatus main body, image forming section 4 is provided at the center, cassette sheet-feeding section 6 is provided under the image forming section 4 in the direction of the height of the apparatus main body, and fixing unit 7 and sheet ejection section 8 are provided above the image forming section 4. Due to this vertical arrangement, sheet conveyance path (1) which is almost in the vertical direction is formed. Sheet S fed out of cassette sheet-feeding section 6 is conveyed along this vertical upper sheet conveyance path (1) to be ejected out of the apparatus main body.

Sheet conveyance path (2) formed by automatic duplex copy sheet-feeding section 9 is formed to be almost in parallel with this vertical sheet conveyance path (1).

Owing to these vertical sheet conveyance paths (1) and (2) thus formed, there is structured a shortest sheet conveyance path from cassette sheet-feeding section 6 to sheet ejection section 8. By opening one side of the apparatus main body, it is possible to make the sheet conveyance paths (1) and (2) to be exposed easily.

In the vertical conveyance system like this, main structural means can be concentrated on one side of the apparatus main body. Therefore, it is possible to form concave space section 1A on the top surface section of the apparatus main body and to form concave space section 1B at the central section of the apparatus main body. These concave space sections 1A and 1B are formed to be lower in terms of position than a sheet ejection outlet of sheet ejection section 8.

When sheet post-processing apparatus FS is mounted on image forming apparatus 1, sheet conveyance section 10 of the sheet post-processing apparatus FS is housed in the aforesaid concave space section 1A. In this case, sheet inlet section 10A of the-sheet conveyance section 10 is connected with sheet ejection outlet 8B of sheet ejection section 8 in image forming apparatus 1. Further, under this state of mounting, sheet stacking section 20 and sheet post-processing section 30 of sheet post-processing apparatus FS are housed in the aforesaid concave space section 1B. Movable sheet ejection tray section 40 composed of plural sheet ejection trays and means to move up and down is positioned on the side of the apparatus main body.

Figure 3:
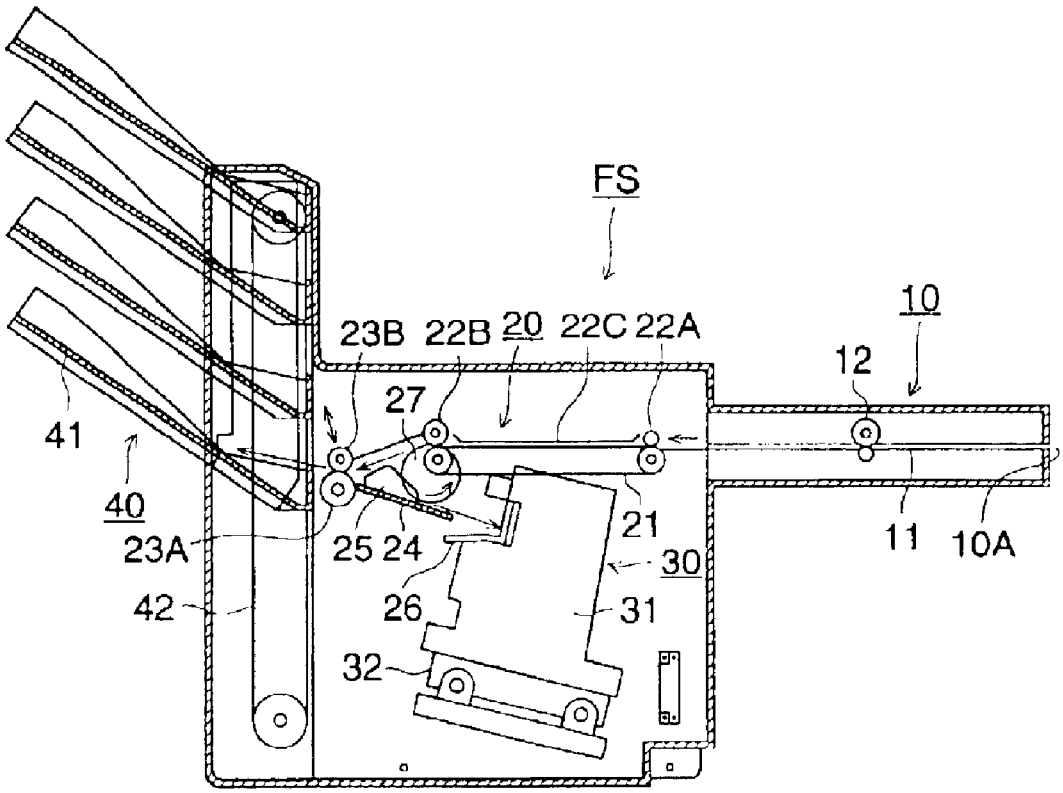
FIG. 3 is a sectional view of the sheet post-processing apparatus.

FIG. 3 is a sectional view of sheet post-processing apparatus FS.

In FIG. 3 sheet post-processing apparatus FS is composed of sheet conveyance section 10, sheet stacking section 20, sheet post-processing section 30 and movable sheet ejection tray 40 to be unitized as a unit which can be mounted on and dismounted from the apparatus main body, and it can be drawn out along a guide rail toward this side of the drawing.

The positioning of the post-processing apparatus, in relation to the apparatus main body, is carried out by, for example, inserting a roller, provided in the post-processing apparatus, to the dent portion provided in the apparatus main body. Therefore, a coupling member is configured with such guide rail, roller or the like.

The sheet conveyance section 10 is composed of sheet conveyance guide plate 11 which is connected with inlet section 10A facing sheet ejection outlet 8B of sheet ejection section 8 and guides ejected sheet S to sheet stacking section 20 and of sheet conveyance paired rollers 12 which nip sheet S to convey it. The sheet conveyance guide plate 11 forms a conveyance path which is mostly horizontal.

The sheet stacking section 20 is composed of conveyance belt 21, driven rollers 22A and 22B which come in pressure contact with the conveyance belt 21 to be driven to rotate, guide plate 22C located on the upper side of the conveyance belt 21, driving roller 23A which is arranged at the downstream side of the conveyance of the conveyance belt 21 and is connected with a driving source to rotate regularly and reversely, driving roller 23B which is swung to be capable of coming in contact with or parting from the driving roller 23A, stacking stand 24 on which the sheet S ejected from the conveyance belt 21 is stacked, width adjusting means 25 which regulates a width of sheet S stacked on the stacking stand 24 to true up the sheet edge, stopping means (stopper) 26 which is hit by the leading edge in the advancement direction of sheet S stacked on the stacking stand 24 to determine the position in the conveyance direction, and ring-shaped auxiliary conveyance member 27 which feeds sheet S stacked on the stacking stand 24 into the stopper 26.

The sheet post-processing section 30 is composed of stapling means (stapler) 31 which forces staple SP into a bundle of sheets and moving means 32 which moves the stapler 31 to the prescribed position to rotate it.

The movable sheet ejection tray 40 is composed of plural bins 41 which are arranged obliquely, and elevator means 42 which moves the bins 41 up and down in the vertical direction.

Incidentally, through the illustrated sheet post-processing apparatus FS is equipped with bins 41 of four steps, there are margin spaces at the lower portion and the upper portion of the movable sheet ejection tray 40. Therefore, it is possible to install sheet post-processing apparatus FS having the greater number of bins (for example, the sheet post-processing apparatus with 10–20 bins). Further, this sheet post-processing apparatus FS can also have a function for sorting such as a mail box.

Each of FIGS. 4(a)–4(c) is an illustration showing how sheet S is conveyed in sheet post-processing apparatus FS.

(1) First conveyance path (3) (see FIG. 4(a))

Sheet S having thereon formed images ejected from sheet ejection outlet 8B of sheet ejection section 8 in image forming apparatus 1 is led to inlet section 10A of sheet conveyance section 10 in sheet post-processing apparatus FS, then, it passes through a conveyance path in sheet conveyance guide plate 11, and is nipped by rotating sheet conveyance paired rollers 12 and is conveyed to be fed into sheet stacking section 20.

The sheet S fed into the sheet stacking section 20 is conveyed by rotating conveyance belt 21 and by driven rollers 22A and 22B which are in pressure contact with the conveyance belt 21. The leading edge section of the sheet S is nipped between driving roller 23A which is located at the downstream side in conveyance and rotates in the regular direction and driving roller 23B to pass, and goes up along the inclined face of bin 41 of the movable sheet ejection tray 40. When the trailing edge section of the sheet S passes through the nipping position between the conveyance belt 21 and driven roller 22B, the trailing edge section of the sheet S is lowered by gravity and it touches the inclined face of the stacking stand 24.

(2) Second conveyance path (4) (see FIG. 4(b))

After the passage of the trailing edge of sheet S is detected by sensor PSI provided in the vicinity of conveyance belt 21, the prescribed time is measured by the timer, and driving roller 23B is driven to rotate reversely, and thereby, rotation of driving roller 23A driven by the same driving source is stopped through a one-way clutch. Incidentally, driving roller 23B is made of soft foamed material such as a sponge roller, and it comes in slight pressure contact with sheet S on driving roller 23A.

Due to switching to the reverse rotation of driving roller 23B, sheet S which is in slight pressure contact with driving roller 23B rotating reversely and driving roller 23A which stops at the nipping position is conveyed downward obliquely on stacking stand 24, and then is stopped when the trailing edge of the sheet S hits stopper 26. When the sheet is conveyed downward obliquely, auxiliary conveyance member 27 conveys the sheet while preventing that the sheet is lifted.

Paired width adjusting means 25 provided rotatably on both sides of the stacking stand 24 can move in the direction perpendicular to the sheet conveyance direction, and they are opened to be broader than the sheet width when they accept the sheet conveyed on the stacking stand 24, and they rap the side of sheet S in its lateral direction and conduct truing up of a bundle of sheets (width adjustment) when the sheet is conveyed on the stacking stand 24 and is stopped by stopper 26.

Succeeding sheet S also passes through the first conveyance path (3) and the second conveyance path (4) in the same way, and is stacked successively on the preceding sheet S on the stacking stand 24, and it is adjusted in terms of width each time it is stacked and comes in contact with the stopper to be stopped.

After trailing edges of all sheets S equivalent to one copy come in contact with stopper 26, staple SP is forced into a bundle of sheets by stapler 31, thus, a booklet is formed.

(3) Third conveyance path (5) (see FIG. 4(c))

After completion of the staple processing, the suspended driving roller 23A is switched to the regular rotation, and a bundle of sheets nipped between the driving roller 23A and the driving roller 23B which has been switched to strong pressure contact by a cam and others is conveyed upward obliquely to be housed in bin 41.

FIG. 5 is a sectional view of image forming apparatus 1 showing how sheet ejection tray (fixed sheet ejection tray) 50 is mounted.

Positioning of unitized sheet post-processing apparatus FS is released, and it is drawn out of image forming apparatus 1 through a guide rail by pulling toward this side in FIG. 1.

Next, sheet ejection tray 50 is inserted into concave space sections 1A and 1B on the upper portion of the image forming apparatus by pushing it from this side to the back side on the page, and the sheet ejection tray 50 is fixed. The sheet S requiring no post-processing can be ejected from sheet ejection section 8 to be stacked on the sheet ejection tray 50.

FIG. 6 is a side view of the left side of image forming apparatus 1 from which sheet post-processing apparatus FS and sheet ejection tray 50 have been removed.

It is possible to get an unbroken view of sheet ejection outlet 8B of sheet ejection section 8 and an sheet ejection roller from the left side of image forming apparatus 1. Below the sheet ejection outlet 8B, the concave space section 1A on the upper step and the concave space section 1B on the lower step are arranged to be opened. In the convex section on the illustrated left side of the concave space sections 1A and 1B, there are housed driving mechanism, a power supply section and control sections.

In the image forming apparatus 1 of the present embodiment, a sheet feeding means of cassette sheet feeding section 6, image forming section 4, fixing unit 7 and sheet ejection section 8 are provided upward in this order vertically in the main body of the image forming apparatus 1 as stated above. Therefore, it is possible to minimize the number of reversing sections in the conveyance path for sheet S, and thereby to restrain occurrence of problems such as conveyance troubles (occurrence of jam).

Incidentally, automatic duplex copy sheet feeding section (ADU) 9 is arranged on the side (right side in FIG. 1) which is opposite to that where a sheet-feeding cassette of cassette sheet feeding section 6, high voltage power supply sections 5A and 5B and image writing section 3 are provided.

Further, since the image forming apparatus 1 is structured as stated above, concave space sections 1A and 1B are formed on the other side of the fixing unit 7 and sheet ejection section 8. In the present embodiment, in particular, a useless space is formed between the image forming apparatus 1 and image reading device Y, because the image reading device Y is provided on the top surface of the main body of the image forming apparatus 1.

In the present embodiment, therefore, sheet post-processing apparatus FS is provided removably in that space. In the structure in this case, a part of the sheet post-processing apparatus FS (including sheet conveyance section 10, sheet stacking section 20 and sheet post-processing section 30) is arranged on the upper portion (above the sheet-feeding cassette of cassette sheet feeding section 6 and image writing section 3) of the image forming apparatus 1, and movable sheet ejection tray section 40 wherein a large number of bins are arranged vertically is arranged to be protruded from the side of the main body of the image forming apparatus 1.

Therefore, it is possible to shorten the conveyance path for sheet S ejected from sheet ejection section 8 of the image forming apparatus 1 and thereby to reduce the sheet conveyance time to improve copying productivity, and it is also possible to simplify the sheet conveyance structure for improvement of sheet conveyance and reduction of manufacturing cost.

It is further possible to reduce a floor space for the image forming apparatus 1 equipped with sheet post-processing apparatus FS, and thereby to attain a compact system. Further, the movable sheet ejection tray section 40 can be made to be one with multiple steps (having the steps in quantity not less than four steps in the present embodiment illustrated), or to be one on which a large number of sheets can be stacked.

In the present embodiment, it is further possible to install sheet ejection tray 50 or sheet post-processing apparatus FS in concave space sections 1A and 1B. Namely, sheet ejection tray 50 and sheet post-processing apparatus FS are made to be replaceable each other so that either one of them may be installed. It is therefore possible to establish a necessary system simply without increasing a floor space, in compliance with user's demands.

Through the sheet post-processing apparatus connected to a copying machine is shown in the present embodiment, the invention can also be applied to a sheet post-processing apparatus used through connection to an image forming apparatus such as a printer and a facsimile machine or to a printing machine of a popular type. For example, it is also possible to apply to one which is made to be of printer specifications by removing the image reading device Y installed removably on the image forming apparatus 1.

In the image forming apparatus of the invention, owing to the structure wherein a concave space section is formed on the upper surface section of the apparatus, and a sheet post-processing apparatus equipped with a sheet conveyance section having a horizontal conveyance path, a sheet stacking section and with a sheet post-processing section is utilized to be capable of being installed on the concave space section, it is possible to minimize a floor space of an image forming apparatus equipped with a sheet post-processing apparatus.

In addition, by making a sheet conveyance path from a sheet ejection section to a post-processing section to be shortened, an improvement of efficiency of sheet conveyance is attained.

Further, due to the fixed sheet ejection tray which can be mounted on the concave space section stated above, it is possible to minimize a floor space to attain compactness by eliminating the protruded portion on the main body of the image forming apparatus, even when a sheet post-processing apparatus is not mounted, and to improve sheet handling efficiency.

What is claimed is:

1. An image forming apparatus comprising:

an image forming device which includes a sheet ejection section, provided in an upper portion of said image forming device, for finally ejecting a recording sheet onto an upper surface portion of said image forming device;

a first coupling member;

a sheet post-processing apparatus selectively coupled with said sheet ejection section for performing a post-processing operation on said recording sheet ejected from said image forming device, a second coupling member for coupling with said first coupling member;

wherein said sheet post-processing apparatus is selectively coupled with said sheet ejection section by said first and section coupling members so that at least a part of said post-processing apparatus is located on said upper surface portion of said image forming device.

2. The image forming apparatus of claim 1, wherein said sheet post-processing apparatus includes a sheet conveyance section wherein said sheet conveyance section is provided substantially horizontal and on said upper surface portion of said image forming apparatus when said sheet post-processing apparatus is coupled with said image forming apparatus.

3. The image forming apparatus of claim 1, wherein said sheet post-processing apparatus is capable of performing at least one of staple processing and shift sorting processing.

4. The image forming apparatus of claim 1, wherein said sheet post-processing apparatus includes a sheet post-processing section and said sheet post-processing apparatus is coupled with said image forming device so that at least a part of said sheet post-processing section is located on said upper surface portion of said image forming device.

5. The image forming apparatus of claim 4, wherein said sheet post-processing section is for performing staple processing.

6. The image forming apparatus of claim 4, wherein said sheet post-processing section includes:

a sheet stacking section for stacking a plurality of recording sheets so that said plurality of recording sheets are subjected to post-processing;

a sheet conveyance section for conveying a recording sheet to said sheet stacking section;

wherein said sheet stacking section and sheet conveyance section are located on said upper surface portion of said image forming device.

7. The image forming apparatus of claim 1, wherein said sheet post-processing apparatus includes:

a plurality of movable sheet ejection trays capable of moving vertically when said sheet post-processing apparatus is coupled with said image forming device;

wherein said sheet post-processing apparatus is coupled with said image forming device so that said plurality of movable sheet ejection trays are projected from said image forming device at a side thereof.

8. The image forming apparatus of claim 1, comprising:

an image reading device for reading an image;

wherein said image reading device is located upper than said upper surface portion of said image forming device.

9. The image forming apparatus of claim 8, wherein said sheet post-processing apparatus is inserted between said image reading device and said upper surface portion of said image forming device so as to be coupled with said image forming apparatus.

10. The image forming apparatus of claim 1, wherein said post-processing apparatus is capable of being drawn to the front side of said image forming apparatus.

11. The image forming apparatus of claim 1, wherein said upper surface portion of said image forming device apparatus has a concave space section.

12. The image forming apparatus of claim 1 wherein said image forming device comprises:

an image forming section for forming an image on said recording sheet;

a sheet-feeding section for feeding said recording sheet toward said image forming section; and a conveyance path for conveying said recording sheet from said sheet-feeding section to said sheet ejection section through said image-forming section;

wherein said image forming section is located lower than said sheet ejection section, said sheet-feeding section is located lower than said image forming section, and said conveyance path is provided substantially vertical in said image forming apparatus.

13. The image forming apparatus of claim 1 wherein said image forming device further comprises a sheet ejection tray selectively coupled with said sheet ejection section for receiving said recording sheet ejected from said image forming device, said sheet ejection tray being located on said upper surface portion of said image forming device when said sheet rejection tray is coupled with said image forming device; and wherein said sheet ejection tray and said sheet post-processing apparatus are selectively coupled with said image forming device.

*14. An image forming apparatus comprising:*

*(a) an image forming device comprising:*

*(a1) a main body having a space formed in an upper portion of the main body;*

*(a2) an image forming section for forming an image on a sheet, the image forming section located in the main body; and*

*(a3) a sheet ejection section for ejecting the sheet into the space, the sheet ejection section located in the main body;*

*(b) an image reading device for reading an image on a document, the image reading device mounted to the main body so that the space is located beneath the image reading device; and*

*(c) one of a sheet post-processing apparatus for performing a post-processing operation on the sheet ejected from the sheet ejection section, or a sheet ejection tray for stacking the sheet ejected from the sheet ejection section, wherein the sheet post-processing apparatus and the sheet ejection tray are removably installed in the space.*

*15. The image forming apparatus of claim 14, wherein the space is open through at least two sides of the main body.*

*16. The image forming apparatus of claim 14, wherein the space is open to at least two sides of the main body.*

*17. The image forming apparatus of claim 16, wherein the upper portion of the main body includes an upper housing portion located laterally adjacent to the space and a lower housing portion located beneath the space, and wherein the upper housing portion has a width smaller than that of the lower housing portion.*

*18. The image forming apparatus of claim 17, wherein the upper housing portion has a side wall facing the space and the side wall has a sheet ejection outlet through which the sheet is ejected to the one of the sheet post-processing apparatus or the ejection tray.*

*19. The image forming apparatus of claim 18, wherein the upper housing portion is stepped.*

*20. The image forming apparatus of claim 19, wherein the image forming device comprises:*

*a sheet feeding section for feeding the sheet towards the image forming section; the sheet feeding section located in the main body below the image forming section and the image forming section is located below the sheet ejection section; and*

*a conveyance path for conveying the sheet from the sheet feeding section to the image forming section and to the ejection section, and the conveyance path having a substantially vertical orientation in the main body.*

*21. An image forming apparatus comprising:*

*(a) an image forming device comprising:*

*(a1) a main body having a space formed in an upper portion of the main body;*

*(a2) an image forming section for forming an image on a sheet, the image forming section located in the main body and*

*(a3) a sheet ejection section for ejecting the sheet into the space, the sheet ejection section located in the main body;*

*(b) an image reading device for reading an image on a document, the image reading device mounted to the main body so that the space is located beneath the image reading device; and*

*(c) a sheet post-processing apparatus for performing a post-processing operation on the sheet ejected from the sheet ejection section, wherein the sheet post-processing apparatus is removably installed in the space.*

*22. The image forming apparatus of claim 21, wherein the space is open through at least two sides of the main body.*

*23. The image forming apparatus of claim 21, wherein the space is open to at least two sides of the main body.*

*24. The image forming apparatus of claim 23, wherein the upper portion of the main body includes an upper housing portion located laterally adjacent to the space and a lower housing portion located beneath the space, and wherein the upper housing portion has a width smaller than that of the lower housing portion.*

*25. The image forming apparatus of claim 24, wherein the upper housing portion has a side wall facing the space and the side wall has a sheet ejection outlet through which the sheet is ejected to the sheet post-processing apparatus.*

*26. The image forming apparatus of claim 25, wherein the upper housing portion is stepped.*

*27. The image forming apparatus of claim 25, wherein the post-processing apparatus includes a sheet post-processing section for performing the post-processing operation, and wherein the sheet post-processing section is located in the space.*

*28. The image forming apparatus of claim 27, wherein the post-processing apparatus includes a sheet stacking section for stacking a plurality of the sheets, and wherein the sheet stacking section is located in the space.*

*29. The image forming apparatus of claim 28, wherein the post-processing apparatus is capable of performing at least one of staple processing and width adjusting to the sheets on the stacking section.*

*30. The image forming apparatus of claim 27, wherein the post-processing apparatus comprises a sheet ejection tray section for receiving the sheet from the sheet post-processing section.*

*31. The image forming apparatus of claim 30, wherein at least a part of the sheet is conveyed to the sheet ejection tray section, before the sheet had been stacked in the stacking section.*

*32. The image forming apparatus of claim 31, wherein the sheet ejection tray section has a bin for stacking the sheet, which is movable in a vertical direction.*

*33. The image forming apparatus of claim 32, wherein the sheet ejection tray section is located adjacent one of the two sides of main body open to the space.*

*34. The image forming apparatus of claim 32, wherein the upper portion of the main body has a back wall facing the space.*

*35. The image forming apparatus of claim 34, wherein the image forming device comprises:*

*a sheet feeding section for feeding the sheet towards the image forming section; the sheet feeding section located in the main body below the image forming section and the image forming section is located below the sheet ejection section; and*

*a conveyance path for conveying the sheet from the sheet feeding section to the image forming section and to the ejection section, and the conveyance path having a substantially vertical orientation in the main body.*

*36. An image forming apparatus comprising:*

*(a) an image forming device comprising:*

*(a1) a main body having a space formed in an upper portion of the main body;*

*(a2) an image forming section for forming an image on a sheet, the image forming section located in the main body and*

*(a3) a sheet ejection section for ejecting the sheet into the space, the sheet ejection section located in the main body;*

*(b) an image reading device for reading an image on a document, the image reading device mounted to the main body so that the space is located beneath the image reading device; and*

*(c) a sheet ejection tray for stacking the sheet ejected from the sheet ejection section, wherein the sheet ejection tray are removably installed in the space.*

*37. The image forming apparatus of claim 36, wherein the space is open through at least two sides of the main body.*

*38. The image forming apparatus of claim 36, wherein the space is open to at least two sides of the main body.*

*39. The image forming apparatus of claim 38, wherein the upper portion of the main body includes an upper housing portion located laterally adjacent to the space and a lower housing portion located beneath the space, and wherein the upper housing portion has a width smaller than that of the lower housing portion.*

*40. The image forming apparatus of claim 39, wherein the upper housing portion has a side wall facing the space and the side wall has a sheet ejection outlet through which the sheet is ejected to the one of the sheet post-processing apparatus or the ejection tray.*

*41. The image forming apparatus of claim 40, wherein the upper housing portion is stepped.*

*42. The image forming apparatus of claim 41, wherein the image forming device comprises:*

*a sheet feeding section for feeding the sheet towards the image forming section, the sheet feeding section located in the main body below the image forming section and the image forming section is located below the sheet ejection section; and*

*a conveyance path for conveying the sheet from the sheet feeding section to the image forming section and to the ejection section, and the conveyance path having a substantially vertical orientation in the main body.*

*43. An image forming apparatus comprising:*

*(a) an image reading device for reading an image on a document;*

*(b) an image forming device located in a main body located beneath the image reading device, the main body having an upper protruded portion which extends towards the image reading device, an image forming section for forming on a sheet and sheet ejection section located in the upper protruded portion and a space defined by the main body, the upper protruded portion and the image reading device;*

*(c) a sheet post-processing apparatus for performing a post-processing operation on the sheet ejected from the sheet ejection section; and*

*(d) a guide member for guiding the sheet post-processing apparatus into the space to a position adjacent a side of the upper protruded portion of the main body and beneath the image reading device, wherein the sheet post-processing apparatus is removably installed in the position utilizing the guide member.*

*44. The image forming apparatus of claim 43 wherein the post-processing apparatus comprising a sheet ejection tray section for stacking the sheets after the post-processing operation, and the sheet ejection tray is located at a side of the main body.*

*45. The image forming apparatus of claim 44, wherein the image forming device comprises:*

*a sheet feeding section for feeding the sheet towards the image forming section, the sheet feeding section located in the main body below the image forming section and the image forming section is located below the sheet ejection section; and*

*a conveyance path for conveying the sheet from the sheet feeding section to the image forming section and to the ejection section, and the conveyance path having a substantially vertical orientation in the main body.*

*46. An image processing system, comprising:*

*an image forming apparatus for forming an image on a sheet, the image forming apparatus having a cavity in an upper portion thereof and an outlet for ejecting a sheet from the image forming apparatus; and*

*a sheet post-processing apparatus for performing at least one post-processing operation on the sheet from the outlet, at least a portion of the sheet post-processing apparatus being removably installed in the cavity of the image forming apparatus.*

*47. The image processing system of claim 46, further comprising a guide rail for positioning the portion of sheet post-processing apparatus in the cavity.*

*48. The image processing system of claim 47, further comprising a roller for engaging the guide rail when positioning the portion of the post-processing apparatus in the cavity.*

*49. The image processing system of claim 47, further comprising an image reading device positioned above the cavity.*

*50. The image processing system of claim 47, wherein the sheet post-processing apparatus has at least one sheet ejection tray for receiving the sheet.*

*51. The image processing system of claim 47, wherein the image forming apparatus has a generally vertical sheet conveyance path therein.*

*52. The image processing system of claim 47, wherein the post-processing operation on the sheet comprises stapling the sheet.*

*53. The image processing system of claim 47, wherein the post-processing operation on the sheet comprising stacking the sheet.*

* * * * *